2,882,161

PHOTOGRAPHIC EMULSIONS CONTAINING SYNTHETIC POLYMER VEHICLES

John R. Dann, John W. Gates, Jr., Donald A. Smith, and Cornelius C. Unruh, Rochester, N.Y., assignors to Eastman Kodak Company, Rochester, N.Y., a corporation of New Jersey No Drawing. Application June 29, 1955
Serial No. 518,968

1 Claim. (Cl. 96—114)

This invention relates to photographic silver halide emulsions and in particular to hydrophilic colloid vehicles for such emulsions.

It is well known in photography to employ gelatin as a vehicle or carrier for the light-sensitive silver halides. In recent years, in order to improve the photographic properties of silver halide emulsions, attempts have been made with varied success to prepare photographic emulsions in which the gelatin has been replaced in whole or in part by other hydrophilic organic colloids such as hydrophilic synthetic polymers. Among such polymers is polyvinyl alcohol. Polyvinyl alcohol has many desirable properties, but one of the chief disadvantages of its use is that of the lack of a really good procedure whereby the coated polymer may be hardened at will to the precise degree where water-solubility is lost but permeability to salt solutions is retained along with the desirable physical and mechanical properties of polyvinyl alcohol films. These mechanical and physical properties of polyvinyl alcohol are to a large extent due to the regular spacing of hydroxyl groups along the polymer chain. In order to appreciably affect the water-solubility of the polymer it becomes necessary to react a considerable proportion of these hydroxyl groups in the preparation of various water-insoluble derivatives. Alternatively, appendage of other groups to the polymer chain (other than at the site of the hydroxyl groups) to achieve water-insolubility is likewise generally unsatisfactory, for too many of such appendages are required to attain this water-insolubility and these interfere seriously with the interaction between hydroxyl groups of adjacent chain molecules.

We have discovered that certain hydrophobic appendages may be affixed to the polyvinyl alcohol chain in small quantities to produce water-insoluble derivatives of polyvinyl alcohol and that the inter-molecular secondary valence forces ascribed to the regular spacing of the hydroxyl groups of the polyvinyl alcohol chain are thereby not seriously interfered with, with the result that the desirable properties of the polymer are not destroyed.

As will be apparent from the more detailed description of our invention hereinafter, such polymers can be obtained either by reaction of polyvinyl alcohol with small amounts of compartively high molecular weight compounds containing a functional group capable of reacting with hydroxyl groups imparting the hydrophobic function to the polymer, or by the polymerization of vinyl esters such as vinyl acetate with small quantities of other polymerizable vinyl compounds imparting a hydrophobic character to the polymer, followed by hydrolysis of the vinyl ester portion of the copolymer.

The polymers of the invention may be characterized as copolymers of vinyl alcohol containing from about 0.5 to 3.0 mol percent of one or more recurring units of the structure

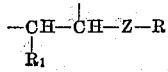

wherein $R_1$ represents a hydrogen atom or a methyl group, R represents an aliphatic hydrocarbon chain of from 12 to 18 carbon atoms and Z represents the atoms linking R to the polymer chain, the remaining recurring units of the polymer (99.5–97 mol percent) being substantially all vinyl alcohol units. It will be appreciated from the description hereinafter that since the synthesis of the polymers involves either the use of polyvinyl alcohol normally containing about 1 mol percent or less of vinyl ester groups, or involves the hydrolysis of vinyl ester copolymers with the result that about 1 mol percent or less of vinyl ester units remain in the copolymer, the mentioned range of 99.5 to 97 mol percent of vinyl alcohol units includes these small amounts of unhydrolyzed vinyl ester. Typical polymers of the invention are the vinyl alcohol-vinyl octadecyl ether copolymers which may be represented by the formula

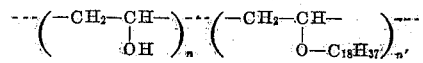

wherein $n$ and $n'$ are numbers the ratio of which is such that the amount of vinyl octadecyl ether units in the polymer varies from about 0.5 to 3.0 mol percent and the vinyl alcohol content varies from about 99.5 to 97 mol percent.

Representative polymers useful in our invention as emulsion vehicles are vinyl alcohol copolymers containing from about 0.5 to 3.0 mol percent of the following recurring units, the remaining recurring units being substantially all vinyl alcohol units:

(I) $-CH_2-CH-O-CO-R$
        $\phantom{-CH_2-CH-}$
e.g. vinyl palmitate.

(II) $-CH_2-CH-O-CO-NH-R$
e.g. vinyl N-octadecylcarbamate.

(III) $-CH_2-CH-O-R$
e.g. vinyl octadecyl ether.

(IV) $-CH_2-CH-CH_2-CH-$
         $\phantom{xx}O\phantom{xxx}O$
         $\phantom{xxx}\backslash\phantom{x}/$
         $\phantom{xxxx}H$
         $\phantom{xxxx}C$
         $\phantom{xxxx}|$
         $\phantom{xxxx}R$
e.g. vinyl octadecenyl acetal.

(V) $-CH_2-CH-CH_2-O-CO-R$
e.g. allyl stearate.

(VI) $-CH_2-CH-CH_2-O-CO-NH-R$
e.g. allyl N-octadecylcarbamate.

(VII) $-CH_2-CH-CH_2-O-R$
e.g. allyl octadecyl ether.

(VIII) $-CH_2-CH-CH_2-NH-CO-NH-R$
e.g. N-allyl-N'-octadecyl urea.

(IX) $-CH_2-CH-CH_2-NH-CO-R$
e.g. N-allylpalmitamide.

(X) $-CH(CH_3)-CH-CO-NH-R$
e.g. N-octadecylcrotonamide.

(XI) $\phantom{xxxxxxxxxxxxxxxxxxxx}R$
$-CH_2-CH-O-CO-CH_2-CH-COOH$
e.g. vinyl tetradecenylsuccinate.

(XII) $\phantom{xxxxxxxxxxxx}R$
$-CH_2-CH-O-CO-CH-CO-R$
e.g. vinyl α-palmitoylmyristate.

The copolymers of the invention having the recurring units I–IV, XI and XII are conveniently prepared by reaction of polyvinyl alcohol with the desired compound such as palmitoyl chloride in the case of I as shown in the examples hereinafter. The vinyl alcohol copolymers containing the units V–X are prepared by polymerizing a vinyl ester such as vinyl acetate with the desired monomer such as allyl-N-octadecyl carbamate (VI) and hydrolyzing the acetyl groups of the polymer chain as described in the following examples.

EXAMPLE 1

Polyvinyl palmitates

A suspension of 22.0 g. of dried polyvinyl alcohol in 200 ml. of dry pyridine was kept at 60° for 5 hours then chilled in ice and treated with 5.0 g. of palmitoyl chloride in 20 ml. of dry pyridine. After standing overnight the mixture was stirred and heated on the steam bath for one hour then filtered and the solid washed with pyridine, then with ether.

In a similar manner, 2, 10 and 15 grams of palmitoyl chloride were reacted with 22 grams of polyvinyl alcohol. The polymers contain the recurring units I and may be dissolved in dilute ethyl alcohol for use in emulsions.

EXAMPLE 2

Polyvinyl octadecyl carbamates

A quantity of polyvinyl alcohol was dried by warming it in a vacuum desiccator at 40° C. overnight over phosphoric anhydride at a pressure of less than 1 mm. Hg. The polyvinyl alcohol was spread in layers of about ¼" thick. This was stored in a closed system until used.

Four samples of one hundred and ten grams of the dried polyvinyl alcohol were suspended in separate one liter portions of dried pyridine (dried by distillation over calcium hydride) and the suspension heated on a steam bath for two hours under anhydrous conditions while occasionally stirred. The mass was cooled to room temperature and varying proportions of octadecyl isocyanate (Table I) were added to each mixture. These four reaction mixtures were then allowed to stand at room temperature for about one-half hour with stirring, enabling the isocyanate to permeate the swollen polyvinyl alcohol particles. The mixtures were then heated and stirred on the steam bath under anhydrous conditions for two hours. The hot mixtures were then filtered by suction and the polymer again suspended in a liter of fresh pyridine, heated and stirred on the steam bath until a temperature of 85–90° C. had been attained, and again rapidly filtered while hot. A small amount of dioctadecylurea usually crystallized out of the filtrates on cooling. The polymeric products, still in the form of discrete particles, were then thoroughly washed in a number of changes of acetone. An analytical sample (10–15 g.) from each batch was extracted with hot pyridine for six hours in a Soxhlet then extracted thoroughly with acetone and dried. The following table shows the amount of polyvinyl octadecyl carbamate in each sample and the corresponding solubility characteristics of each polymer.

EXAMPLE 3

Vinyl octadecyl ether polymers

A solution containing 86.0 g. of vinyl acetate, 1.0 g. of vinyl octadecyl ether, 0.2 g. of benzoyl peroxide and 25 ml. of methanol was kept at 65° C. for four days. The viscous dope was diluted with 225 ml. of methanol and treated with 25 ml. of 10% sodium hydroxide in methanol. The colorless gel which formed was cut up and washed first with methanol then water.

In a series of similar syntheses, 2.0 g., 3.0 g., and 4.0 g. of vinyl octadecyl ether were used to obtain polymers also soluble in warm water or dilute ethyl alcohol solutions.

EXAMPLE 4

Various polyvinyl acetals can be prepared as follows:

Palmitoylaminoacetaldehyde polyvinylacetals

Preparation of palmitoylaminoacetaldehyde diethyl acetal.—To a solution of 10.0 g. of aminoacetal in 110 ml. of 5 percent potassium hydroxide was added 25.0 g. of palmitoyl chloride with stirring and cooling. The white precipitate which formed was collected, washed, and recrystallized from ethanol.

Preparation of polymer.—To a solution of 93.0 g. of polyvinyl acetate in 217 g. of methanol was added a warm solution of 2.0 g. of palmitoylaminoacetal in 100 ml. of methanol and 12 ml. of concentrated hydrochloric acid in 40 ml. of methanol. After keeping at 50° for 42 hours the solution yielded an opaque gel which was ground and washed with methanol. The product was purified by solution in hot dilute ethanol and precipitation in ethanol.

In a similar manner, 5, 10 and 15 grams of palmitoylaminoacetal were reacted with 93.0 grams of polyvinyl acetate to obtain hydrophilic vinyl alcohol copolymers soluble in hot water or hot dilute ethanol.

Other useful acetals of polyvinyl alcohol can be prepared by using from about 5 to 20 grams of cetyloxyacetal (Ann. Chem. [11], 1, 439 (1934)) or from about 2 to 20 grams of lauryloxyacetal in the above procedure.

A vinyl octadecenyl acetal (see Formula IV) can be prepared as follows:

A solution of 432 grams of polyvinyl acetate in 1008 grams of methanol was treated with 139 grams of octadecenyl aldehyde in 450 ml. of methanol. To this solution (stirred) was added 55.5 ml. of concentrated hydrochloric acid in 140 ml. of methanol and the whole kept at 50° for forty-eight hours. The resulting gel was ground, washed with methanol, doped in hot dilute ethanol and precipitated in acetone. After washing with ether and drying in vacuo, the yield was 210 grams.

In a similar manner, 93 gram samples of polyvinyl acetate in 217 grams of methanol were treated with 2.0, 5.0, 10.0, 15.0, 30.0 and 50.0 grams of octadecenyl aldehyde, respectively, in 130 cc. of methanol to which were added 12 cc. of concentrated hydrochloric acid to obtain polymers soluble in either hot water, hot dilute ethanol solution or dimethyl formamide.

TABLE I

| Sample No. | Grams Isocyanate Used | Yield, percent | Polyvinyl Octadecyl Carbamate | | Solubility in— | | | |
|---|---|---|---|---|---|---|---|---|
| | | | Wt. percent | Mol percent | Boiling Water | Hot 10% Alcohol | Hot 20% Alcohol | Hot 30% Alcohol |
| G142-11G | 30 | 85–90 | 10.6 | 1.50 | insol | insol | insol | sol. |
| G142-11H | 20 | 85–90 | 8.4 | 1.14 | insol | insol | insol | sol. |
| G142-13D | 10 | 85–90 | 3.9 | 0.50 | insol | insol | sol | sol. |
| G142-13K | 5 | 85–90 | 2.4 | 0.32 | insol | sol | sol | sol. |

The above analyses for polyvinyl octadecyl carbamate were based upon the nitrogen content of the polymers determined by the Kjeldahl method.

EXAMPLE 5

Allyl N-octadecylcarbamate

A mixture of 100 ml. of allyl alcohol and 100 ml. of octadecyl isocyanate was heated three hours on the steam bath. After standing overnight, the solution had set to a solid mass which was broken up and washed with a little allyl alcohol then recrystallized three times from ethanol, yield 65.8 g., M.P. 56–57°.

Calcd. for $C_{22}H_{43}NO_2$: C, 74.8; H, 12.2; N, 3.97. Found: C, 74.1; H, 12.6; N, 4.4.

*Vinyl alcohol-allyl N-octadecylcarbamate copolymer*

(See Formula VI)

A polymerization vessel was charged with ten pounds of vinyl acetate, 182 grams allyl N-octadecylcarbamate prepared as above, three pounds 11 ounces of methanol, 13.2 grams of benzoyl peroxide and 13.2 grams of potassium persulfate. The solution was stirred at 65° for 22 hours, then diluted with sufficient methanol to give a 30% solution. To this solution was added with stirring 1 pound, 14 ounces of 10% sodium hydroxide in methanol. The gel which formed was ground and washed with several changes of cold water, then allowed to stand overnight in 0.1 N sodium hydroxide. After three more water washes, the product was covered with 10 gallons of water containing 210 ml. of acetic acid and allowed to stand overnight. The gel (Polymer A) was finally washed with four changes of water and drained. Yield 17 lbs., 10 oz. Found: N, 0.30%.

In three otherwise identical syntheses the 182 grams of allyl N-octadecylcarbamate in the above procedure was replaced by 140.4, 92.7 and 45.9 grams respectively of the same carbamate to obtain vinyl alcohol-allyl N-octadecylcarbamate copolymers B, C and D, containing 0.24, 0.17 and 0.08 percent nitrogen respectively. Polymers A, B, C and D were found to be swellable in water and soluble in dilute alcohol solutions.

EXAMPLE 6

*Vinyl alcohol-allyl octadecyl ether copolymer*

(See Formula VII)

A mixture of 250 grams of vinyl acetate, 10 grams allyl octadecyl ether (J.A.C.S. 64, 3045 (1942)) and 1.3 grams benzoyl peroxide were heated under reflux at 60° C. After three days a clear, colorless non-flowing mass was obtained which was dissolved in 600 ml. of methanol. To the stirred solution was added 75 ml. of a 10% solution of sodium hydroxide in methanol and allowed to stand. In about five minutes a red-brown solution formed which gelled. The tough gel was cut in small pieces and covered with methanol, allowing it to stand overnight. The methanolic solution was decanted and the gel was covered with water allowing it to stand another eight hours. The polymer was now washed thoroughly with cold water until the washings were neutral. The washed gel was dissolved in hot water containing sufficient ethanol to give a clear solution. This was poured into a large volume of methanol. The nearly white, fibrous polymer A was leached in fresh methanol, then dried at 40° C.

In a similar group of syntheses to four solutions each containing 86.0 grams of vinyl acetate, 0.2 gram of benzoyl peroxide and 25 cc. of methanol were added 1.0, 2.0, 3.0 and 4.0 grams respectively of vinyl octadecyl ether. The soluitions were kept at 60° C. for four days, then diluted with 225 cc. of methanol and treated with 25 cc. of 10% sodium hydroxide in methanol. The resulting colorless gels were cut up, then washed with methanol followed by water. The resulting polymers were found to be water-permeable and could be dissolved in dilute ethyl alcohol solution.

EXAMPLE 7

*Allyloctadecyl urea*

A solution of 120° g. of octadecyl isocyanate in 100 ml. of dry ether was added dropwise with stirring and cooling to a solution of 25.0 g. of allylamine in 200 ml. of dry ether. During the reaction it was necessary to make a further addition of 300 ml. of ether to keep the precipitated solid suspended. When the addition was completed, the solid was collected and recrystallized three times from ethanol, yield 130 g., M.P. 101–102°.

Calcd. for $C_{22}H_{44}N_2O$: C, 75.0; H, 12.5; N, 7.95. Found: C, 74.8; H, 12.8; N, 8.0.

*Vinyl alcohol-allyl octadecyl urea copolymer*

(See Formula VIII)

A solution of 86.0 g. of vinyl acetate, 1.75 g. of allyloctadecyl urea and 0.50 g. of benzoyl peroxide in 40 ml. of methanol was sealed under nitrogen and kept at 60° C. for 69 hours. At the end of this time the clear viscous dope was diluted with 170 ml. of methanol and treated with 25 ml. of 10 percent sodium hydroxide in methanol. Gelation was rapidly complete and the product was purified by washing with methanol, solution in hot dilute ethanol and precipitation in methanol. After drying at 40° the yield was 36 g.

In a similar synthesis in which 4.52 grams of octadecyl allyl urea was used, 36 grams of product was obtained which was also soluble in hot dilute ethanol.

EXAMPLE 8

*N-allylpalmitamide*

A solution prepared from 57.0 g. of allylamine, 42.0 g. of sodium hydroxide and 300 ml. of water was gradually treated with 288 g. of palmitoyl chloride. During the addition the mixture was stirred vigorously and the temperature kept at 15–22° C. When all the acid chloride had been added, the mixture was stirred for one hour then filtered. After washing with water the precipitate was recrystallized three times from alcohol, yielding 160 g. of colorless crystals, M.P. 75–77°.

Calcd. for $C_{19}H_{37}NO$: C, 77.4; H, 12.5; N, 4.75. Found: C, 77.5; H, 12.9; N, 4.4.

*Vinyl alcohol-N-allylpalmitamide copolymer*

(See Formula IX)

A solution consisting of 268 grams vinyl acetate, 13.5 grams N-allylpalmitamide, 100 ml. of methanol and 1.5 grams of benzoyl peroxide was heated under reflux at 60° C. for three days. The clear, colorless viscous mass was dissolved in 1 liter of methanol and this solution was stirred and distilled on a steam bath thus entraining unpolymerized vinyl acetate in the methanolic distillate. Methanol was added to the still pot to replenish methanol removed by distillation. After the monomeric vinyl acetate was substantially removed, the concentration was adjusted to about 30%. Seventy-five milliliters of a 10% methanolic sodium hydroxide was added to the cooled solution with stirring, and in a few minutes a firm colorless gel was formed. This was cut up in small pieces, covered with methanol and allowed to stand for several hours. The supernatant methanol was replaced by water and allowed to stand overnight. The gel was then washed thoroughly with cold water until free of alkali. A small sample of this gel when dried down had a nitrogen content of 0.48% indicating that the polymer contained N-allylpalmitamide, the remaining polymer units being vinyl alcohol units.

In a similar manner, the polymerization may be carried out with more or less N-allylpalmitamide followed by alkaline hydrolysis of the resulting copolymers in the manner described to obtain useful water-permeable vinyl alcohol copolymers soluble in aqueous alcohol solution and containing from about 0.5 to 3.0 mol percent of N-allylpalmitamide.

EXAMPLE 9

*N-octadecylcrotonamide polymer*

A solution consisting of 250 grams vinyl acetate, 10 grams N-octadecylcrotonamide, 30 ml. of methanol and 1.3 grams benzoyl peroxide was heated under reflux in a 60° C. bath for three days. The clear, colorless non-flowing mass was dissolved in 660 ml. of methanol, and to this was added while stirring 75 ml. of a 10% solution of sodium hydroxide in methanol. In about five minutes the pale amber solution set to a firm gel, which was cut up in small pieces and steeped in methanol overnight. The supernatant methanolic solution was decanted and the gel covered with water, allowing it to stand for eight hours. The gel was then washed in running cold water until free from alkali. A small portion of this gel when dried was found to contain 0.31% nitrogen (Kjeldahl).

In a similar manner three samples of 86 grams of vinyl acetate were polymerized in methanol with 1.75, 4.52 and 9.56 grams of N-octadecyl crotonamide respectively under nitrogen using 0.50 gram of the peroxide catalyst, followed by hydrolysis with alcoholic sodium hydroxide solution to obtain vinyl alcohol copolymers soluble in hot dilute ethanol.

EXAMPLE 10

*Vinyl tetradecenylsuccinate polymer*

A solution of 50 g. of polyvinyl alcohol in 450 ml. of dimethyl formamide was kept at 165° while a solution of 3.0 g. of tetradecenylsuccinic anhydride in 40 ml. of dimethyl formamide was added gradually. The reaction mixture was kept at 165–175° for 1½ hours then poured hot into several liters of methanol. After washing the methanol and drying, the yield was 52.8 grams.

In a similar synthesis 5.0 g. of the anhydride was used and the yield of product was 53.5 grams. The polymers were soluble in warm water and dilute alcohol.

EXAMPLE 11

*Vinyl α-palmitoylmyristate polymer*

To a stirred solution of 50 g. of polyvinyl alcohol in 500 ml. of dimethyl formamide at 165–170° C. was added a solution of 5.0 g. of palmitoylmyristoylethenone dissolved in 50 ml. of warm dimethyl formamide. The resulting solution was heated a further half-hour at 165° C. and then poured into a large volume of agitated methanol. The white, fibrous precipitate was washed several times with fresh methanol, then dried at 40° C.

The product was not soluble in hot water, but soluble in hot 30% ethyl alcohol in water (by weight).

Photographic emulsions are prepared from the polymers of the invention in a well-known manner by melting the selected polymer gel and adding to an aqueous solution thereof a water-soluble halide salt as well as silver nitrate to form light-sensitive silver halide in the presence of the polymer vehicle.

While very useful photographic emulsions can be made in this simple manner using the indicated polymers of the invention, it is desirable, as is well known in the art of photographic emulsion making, to precipitate the silver halides in the presence of a silver halide peptizing agent and then to combine the peptized silver halide with the polymeric vehicle of the invention to control grain size and other properties of silver halide emulsions. However, we have found that the copolymer vehicles of the invention will not readily tolerate the use of the usual silver halide peptizing agent such as gelatin, phthalyl gelatin, benzoyl gelatin and other synthetic silver halide peptizing agents described in Yutzy et al. U.S. Patent 2,525,753 and Lowe et al. U.S. Patent 2,614,930 inasmuch as such silver halide peptizing agents tend to agglomerate the silver halide in the presence of the polymer vehicles of the invention.

It has now been found that long-chain succinic anhydride derivatives of proteins such as glue, oxidized casein and oxidized soybean proteins, that is, alkyl succinoyl derivatives of proteins in which the alkyl group contains at least 10 carbon atoms, may be used as silver halide peptizing agents for the silver halides in the presence of the polymer vehicles of the invention with the result that photographic emulsions having excellent physical and photographic properties are obtained. In making the emulsions, the coagulation-wash technique of Yutzy et al. U.S. Patent 2,614,928 or the salting-out process of Hewitson et al. U.S. Patent 2,618,556, may be employed as shown in more detail by the examples hereinafter.

EXAMPLE 12

*n-Octadecenylsuccinoyl bone glue*

To 100 grams of bone glue in 925 ml. of aqueous solution at pH 9.5 and at 45° C. is added 24.6 grams of n-octadecenylsuccinic anhydride dissolved in 200 ml. of acetone. The reaction mixture is stirred at 45° C. for 30 minutes while the pH is maintained at 9.5 with 30 ml. of 20% sodium hydroxide solution. The pH is then lowered to 7.0 with 6 N $H_2SO_4$ and the solution is chilled.

EXAMPLE 13

*Dodecenyl succinoyl bone glue*

To 25 grams of bone glue in 250 ml. of aqueous solution at pH 9.5 and at 45° C. is added 5.0 grams of dodecenyl succinic anhydride dissolved in 50 ml. of acetone. The reaction mixture is stirred for 30 minutes at 45° C. while the pH is maintained at 9.5 with 6 ml. of 20% sodium hydroxide solution. The pH is then lowered to 7.0 with 6 N $H_2SO_4$ and the solution is chilled.

EXAMPLE 14

*Tetradecenyl succinoyl bone glue*

To 25 grams of bone glue in 250 ml. of aqueous solution at pH 9.5 and at 45° C. is added 7.5 grams of tetradecenyl succinic anhydride dissolved in 50 ml. of acetone. The reaction mixture is stirred at 45° C. for one hour while the pH is maintained at 9.5 with 7.5 ml. of 20% sodium hydroxide solution. The pH is then lowered to 7.0 with 6 N $H_2SO_4$ and the solution is chilled.

EXAMPLE 15

*Tetradecenyl succinoyl oxidized casein*

The derivative is prepared in the same manner as Example 14 above except that 25 grams of oxidized casein (Gates and Lowe U.S. Patent 2,691,582) is substituted for the bone glue. The resulting derivative may be coagulated at pH 3.0 and washed in cold water before bringing to pH 7.0.

EXAMPLE 16

*Tetradecenylsuccinoyl oxidized soybean protein*

The derivative is prepared in the same manner as Example 15 above except that 25 grams of oxidized soybean protein (Gates and Lowe U.S. Patent 2,691,582) is substituted for the oxidized casein.

EXAMPLE 17

*Hexadecenylsuccinoyl bone glue*

To a solution of 25 grams of bone glue in 225 ml. of water at 45° C. and at a pH of 9.5 is added 5.0 grams of hexadecenylsuccinic anhydride dissolved in 50 ml. of acetone. This reaction mixture is stirred for a period of 25 minutes while the pH is maintained at 9.5 with 6.5 ml. of 20% sodium hydroxide solution. The pH is then brought to 7.0 with 6 N sulfuric acid. The reaction product may be dried on glass plates.

Representative photographic emulsions illustrating our invention are prepared using the long-chain succinoyl protein derivatives above as peptizing agents for silver halide and the vinyl alcohol copolymers above as emulsion vehicles as follows:

EXAMPLE 18

An emulsion was prepared in the manner of Trivelli and Smith, Phot. J. 79, 1939, and 80, 1940, as follows:

In 500 ml. of distilled water heated to 40° C. were dissolved 16.6 grams of the long-chain protein derivative hexadecenyl succinyl glue described above, 46.5 grams potassium bromide and 0.47 gram potassium iodide. The pH was adjusted to 6.05 and the temperature was elevated to 60° C.

Into this solution, a solution of 56.5 grams silver nitrate dissolved in 565 ml. of distilled water at 50° C. was introduced with mechanical agitation for a period of five minutes. 2.5 N sulfuric acid was added to adjust the pH to 2.5. One hundred twenty grams of sodium sulfate were added and a coagulum formed immediately. After settling for five minutes, the mother liquor was poured off and the coagulum was washed three times with chilled water. The coagulum was dispersed in distilled water to a total weight of 400 grams at 40° C. The pH was adjusted to 6.7 with 2.5 N NaOH.

A solution of 11.2 grams of the vinyl alcohol-allyl N-octadecylcarbamate polymer B of Example 5 in 148.8 grams of 19 weight percent aqueous isopropyl alcohol was prepared at 50° C. and pH 6.7. To this solution was added a mixture prepared by adding 6.9 cc. of isopropyl alcohol to 40 grams of the above coagulum. The resulting emulsion was coated on a support and after exposure, development and fixation in the usual manner, was found to have satisfactory photographic properties.

EXAMPLE 19

An emulsion was prepared in the manner of Trivelli and Smith above as follows:

In 250 ml. of distilled water heated to 40° C. were dissolved 8.3 grams of the long-chain protein derivative dodecenyl succinoyl bone glue of Example 13 above, 23.25 grams potassium bromide and 0.235 gram potassium iodide. The pH was adjusted to 6.0 and the temperature was elevated to 60° C.

Into this solution a solution of 28.25 grams of silver nitrate dissolved in 275 ml. of distilled water at 50° C. was introduced with mechanical agitation for a period of five minutes. 2.5 N sulfuric acid was added to adjust the pH to 3.0. A coagulum formed immediately and after sufficient cooling and settling, the mother liquor was decanted. The coagulum was redispersed in 500 ml. distilled water at 40° C. and a pH of 6.0. The pH was adjusted to 4.0 and a coagulum again formed which was cooled and the mother liquor was poured off. The coagulum was dispersed in distilled water to a total weight of 200 grams at 40° C. The pH was adjusted to 6.7 with 2.5 N NaOH.

A solution of 11.2 grams of the vinyl alcohol-allyl N-octadecylcarbamate polymer C of Example 5 in 148.8 grams of 17 weight percent aqueous isopropyl alcohol was prepared at 50° C. and pH 6.7. To this solution was added a mixture prepared by adding 6.1 cc. of isopropyl alcohol to 40 grams of the above coagulum. The emulsion was then coated on a support and found to have satisfactory photographic properties.

EXAMPLE 20

An emulsion was prepared in the manner described by Trivelli and Smith above as follows:

In 500 cc. of distilled water at 40° C. were dissolved 16.6 grams of tetradecenyl succinoyl bone glue derivative of Example 14, 46.5 grams of potassium bromide and 0.47 gram of potassium iodide. The pH was adjusted to 6.0 and the temperature raised to 60° C. Into this solution a solution of 56.5 grams of silver nitrate in 550 cc. of distilled water at 50° C. was introduced and agitation for a period of five minutes. 2.5 N sulfuric acid was added to adjust the pH to 3.0. A coagulum formed immediately and after sufficient cooling and settling, the mother liquor was decanted. The coagulum was redispersed in 1000 cc. of distilled water at 40° C. and a pH of 6.0. The pH was adjusted to 4.0 and a coagulum again formed which was cooled and the mother liquor was poured off. The coagulum was dispersed in distilled water to a total weight of 400 grams at 40° C. The pH was adjusted to 6.7 with 2.5 N sodium hydroxide.

*Emulsion 1.*—A solution of 11.2 grams of the vinyl alcohol-allyl N-octadecylcarbamate polymer A of Example 5 in 148.8 grams of 22 weight percent aqueous isopropyl alcohol was prepared at 50° C. and pH 6.7. To this solution was added a mixture prepared by adding 8.0 cc. of isopropyl alcohol to 40 grams of the above coagulum.

The emulsion was then coated on a base and found to have satisfactory photographic properties.

*Emulsion 2.*—Another emulsion was prepared in the same manner as Emulsion 1 except that polymer D swollen with 16 weight percent isopropanol in water of Example 5 was substituted in like quantity for polymer A of Example 5 and 5.8 cc. instead of 8.0 cc. of isopropyl alcohol were added to 40 grams of the emulsion coagulum.

*Emulsion 3.*—An emulsion was prepared in the same manner as Emulsion 1 of this example except substituting for polymer A a like quantity of the vinyl alcohol-N-allylpalmitamide polymer fo Example 8 and adding 11 cc. rather than 8 cc. of isopropyl alcohol to the 40 grams of emulsion coagulum.

*Emulsion 4.*—An emulsion was prepared in the same manner as Emulsion 1 of this example except using for polymer A a like amount of the N-octadecyl crotonamide polymer of Example 9 and 10.5 cc. of isopropyl alcohol for 40 grams of the emulsion coagulum.

*Emulsion 5.*—As Emulsion 1 but using a like amount of the vinyl octadecenyl acetal polymer of Example 4 and 9 cc. of isopropyl alcohol for 40 grams of the coagulum.

EXAMPLE 21

An emulsion coagulum was prepared by the method of Example 20 except using the tetradecenyl succinoyl oxidized casein of Example 15 as the long-chain protein derivative silver halide peptizing agent.

*Emulsion 1.*—A solution of 11.2 grams of the vinyl alcohol-allyl N-octadecylcarbamate polymer D of Example 5 in 148.8 grams of 16 weight percent aqueous isopropyl alcohol was prepared at 50° C. and pH 6.7. To this solution was added a mixture prepared by adding 5.8 cc. of isopropyl alcohol to 40 grams of the above coagulum.

*Emulsion 2.*—A solution of 11.2 grams of the vinyl alcohol-allyl octadecyl ether polymer of Example 6 in 148.8 grams of 20 weight percent aqueous isopropyl alcohol was prepared. To this solution was added a mixture prepared by adding 7 cc. of isopropyl alcohol to 40 grams of the above coagulum. The emulsion was then coated on a support and found to have satisfactory photographic properties.

*Emulsion 3.*—An emulsion was prepared as Emulsion 1 except using a like amount of the tetradecenylsuccinate polymer of Example 10 and 7 cc. of isopropyl alcohol for 40 grams of the emulsion coagulum.

EXAMPLE 22

An emulsion coagulum was prepared as in Example 20 except using the tetradecenylsuccinoyl oxidized soybean protein of Example 17 as the silver halide peptizing agent.

Forty grams of the resulting coagulum to which had been added 13.1 cc. of isopropyl alcohol were added to 160 grams of the swollen with 17 weight percent isopropanol in water polymer C of Example 5 containing 12.1 grams of dry polymer melted at pH 6.7 and 50° C, The resulting emulsion was then coated on a support and found to have satisfactory photographic properties.

The emulsion coatings prepared as in the above examples were examined for their sensitometric properties by exposure on an Eastman Type 1B Sensitometer followed by development for four minutes, fixation and washing. The developer composition used was as follows:

| | |
|---|---|
| Water _____ cc__ | 500 |
| Monomethyl-p-aminophenol sulfate _____ grams__ | 2.2 |
| Sodium sulfite, desiccated _____ do____ | 96.0 |
| Hydroquinone _____ do____ | 8.8 |
| Sodium carbonate, desiccated _____ do____ | 48.0 |
| Potassium bromide _____ do____ | 5.0 |

Cold water to make 1.0 liter.

The characteristics of the emulsions are shown in the following table:

| Example | 30/E Speed | Contrast | Fog |
|---|---|---|---|
| 18 | 0.29 | 0.26 | 0.04 |
| 19 | 0.925 | 0.41 | 0.04 |
| 20 Emul.: | | | |
| 1 | 0.71 | 0.49 | 0.03 |
| 2 | 0.59 | 0.61 | 0.03 |
| 3 | 0.62 | 0.53 | 0.03 |
| 4 | 0.50 | 0.63 | 0.03 |
| 5 | 1.02 | 0.69 | 0.03 |
| 21 Emul.: | | | |
| 1 | 0.58 | 0.46 | 0.04 |
| 2 | 0.67 | 0.70 | 0.05 |
| 3 | 1.22 | 1.06 | 0.04 |
| 22 | 6.40 | 0.56 | 0.05 |

When emulsions were prepared by the methods of the above examples except substituting gelatin for the vinyl alcohol copolymers, it was found that the resulting gelatino-silver halide emulsions had approximately the same speed, contrast and fog characteristics.

Adhesion of the photographic emulsions made in accordance with this invention, may not be satisfactory on supports subbed for gelatin or other emulsion vehicles. Good adhesion can be obtained however on a support which has first been supplied by any of the well-known methods with a subbing that will insure satisfactory adhesion of a photographic emulsion made with a polyvinyl alcohol vehicle, and then overcoated with a one-percent solution of a hydrocarbon-modified polyvinyl alcohol derivative similar to the hydrocarbon-modified emulsion vehicles of this invention, the preferred concentration of the hydrocarbon-modifying groups being 0.3 to 1.5 mol percent.

For example, the photographic emulsion of Example 18, was coated on a base subbed in the above described fashion on which the last subbing coat was made with an isopropanol solution containing one percent of polyvinyl alcohol modified with 0.6 mol percent of octadecyl urethane side chains. The solution also contained 0.03 percent zirconium nitrate added as a hardener.

Adhesion of the emulsion to the subbed support under both wet and dry conditions was excellent. There was no tendency to strip or frill. This subbing composition was also used to insure good adhesion of photographic emulsions containing as the vehicle copolymers of vinyl alcohol and N-octadecyl crotonamide and copolymers of vinyl alcohol and vinyl octadecyl ether.

What we claim is:

A photographic emulsion comprising a mixture of silver halide and a hydrophilic film-forming polymer containing from about 0.5 to 3.0 mol percent of recurring allyl-N-octadecyl carbamate units and from about 99.5 to 97 mol percent of recurring vinyl alcohol units.

References Cited in the file of this patent

UNITED STATES PATENTS

| | | |
|---|---|---|
| 2,184,288 | Dangelmajer | Dec. 26, 1939 |
| 2,397,865 | Jennings | Apr. 21, 1946 |
| 2,466,404 | Fowler et al. | Apr. 5, 1949 |
| 2,614,930 | Lowe et al. | Oct. 21, 1952 |
| 2,691,582 | Lowe et al. | Oct. 12, 1954 |
| 2,701,243 | Reynolds et al. | Feb. 1, 1955 |